United States Patent [19]

Klein

[11] Patent Number: 4,566,969

[45] Date of Patent: * Jan. 28, 1986

[54] ROLLING FILTER APPARATUS

[75] Inventor: Max Klein, Schrewsbury, N.J.

[73] Assignee: Crane & Co., Inc., Dalton, Mass. ; a part interest

[ * ] Notice: The portion of the term of this patent subsequent to Jul. 19, 2000 has been disclaimed.

[21] Appl. No.: 689,019

[22] Filed: Jan. 4, 1985

Related U.S. Application Data

[63] Continuation-in-part of Ser. No. 482,618, Apr. 6, 1983, abandoned, which is a continuation-in-part of Ser. No. 306,694, Sep. 29, 1981, Pat. No. 4,394,146.

[51] Int. Cl.⁴ .................. B01D 33/32; B01D 33/38
[52] U.S. Cl. .................................... 210/387; 210/401; 210/502.1; 210/509
[58] Field of Search .......... 55/149, 271, 290, 351–354, 55/502, 524, 527, 528; 162/146, 156; 210/387, 400, 401, 502.1, 504, 505, 508, 509; 209/307, 308

[56] References Cited

U.S. PATENT DOCUMENTS

| | | | |
|---|---|---|---|
| 1,949,002 | 2/1934 | Annis | 55/290 |
| 2,119,978 | 7/1933 | Wolthuis et al. | 183/62 |
| 3,228,825 | 7/1966 | Waggoner | 162/156 |
| 3,280,538 | 5/1963 | Schwarz | 55/354 |
| 3,333,693 | 8/1967 | Hirs | 210/387 |
| 3,335,862 | 8/1967 | Hirs | 210/387 |
| 3,348,366 | 9/1963 | Bennett | 55/354 |
| 3,406,503 | 7/1965 | Floyd | 55/354 |
| 3,420,709 | 1/1969 | Barrett, Jr. et al. | 210/502.1 |
| 3,478,879 | 11/1969 | Hirs | 210/387 |
| 3,552,099 | 4/1968 | Floyd | 55/354 |
| 3,573,158 | 3/1971 | Pall et al. | 162/146 |
| 3,622,445 | 11/1971 | Heidweiller | 162/156 |
| 3,675,393 | 7/1972 | Meade | 55/96 |
| 3,690,466 | 9/1972 | Lee et al. | 210/387 |
| 3,704,787 | 12/1972 | Norton | 210/387 |
| 3,749,638 | 7/1973 | Renaud et al. | 162/156 |
| 3,864,266 | 2/1975 | Dietrick | 210/387 |
| 3,902,455 | 9/1975 | Lehmann et al. | 55/351 |
| 3,965,011 | 6/1976 | Sheaffer | 210/31 |
| 4,054,521 | 10/1977 | Winzen | 210/137 |
| 4,160,059 | 7/1979 | Samejima | 210/504 |
| 4,201,675 | 5/1980 | Damerau | 210/387 |
| 4,203,845 | 5/1980 | Brouwer | 210/400 |
| 4,227,899 | 10/1980 | Meny et al. | 55/528 |
| 4,229,187 | 10/1980 | Stockford et al. | 55/14 |
| 4,239,516 | 12/1980 | Klein | 55/389 |
| 4,293,378 | 10/1981 | Klein | 55/528 |
| 4,359,388 | 11/1982 | Nordenskjold | 210/387 |
| 4,394,146 | 7/1983 | Klein | 55/354 |
| 4,395,332 | 7/1983 | Klein | 210/502.1 |

FOREIGN PATENT DOCUMENTS

| | | | |
|---|---|---|---|
| 17712 | 5/1972 | Japan | 210/387 |
| 20058 | 6/1972 | Japan | 210/387 |

OTHER PUBLICATIONS

Mitsubishi Air Cleaner (undated, but translation dated Apr. 10, 1981).

Primary Examiner—David L. Lacey
Attorney, Agent, or Firm—Dann, Dorfman, Herrell and Skillman

[57] ABSTRACT

Filtration apparatus in which the filter medium is in the form of filter material assembled with a carrier web which is caused to traverse through a filter chamber in a zig zag path. The material and carrier web assembly spans between the side walls of the filter chamber and is advanced by turning rolls disposed at upper and lower levels. The carrier web for the filter material extends between flanges projecting from the side walls of the filter chamber and auxiliary support for the carrier web is provided by a foraminous shelf extending between the flanges between the turning rolls and imperforate shelf portions in advance of the first turning rolls and following the last turning roll. Support girders underlie the foraminous shelf to limit deflection of the filter medium. The filter medium is disposed so that its edges overlie the sealing flanges, thereby preventing flow of liquid medium around the edges of the filter medium. The carrier web is formed with imperforate side margins which cooperate with said flanges, and a foraminous zone medially therealong. The filter material covers the foraminous zone and its side edges are within said imperforate side margins. Preferably the filter material comprises a carbon-loaded mat of cellulosic fibrous material which is covered by a second mat of wet-strength glass fibrous material.

17 Claims, 5 Drawing Figures

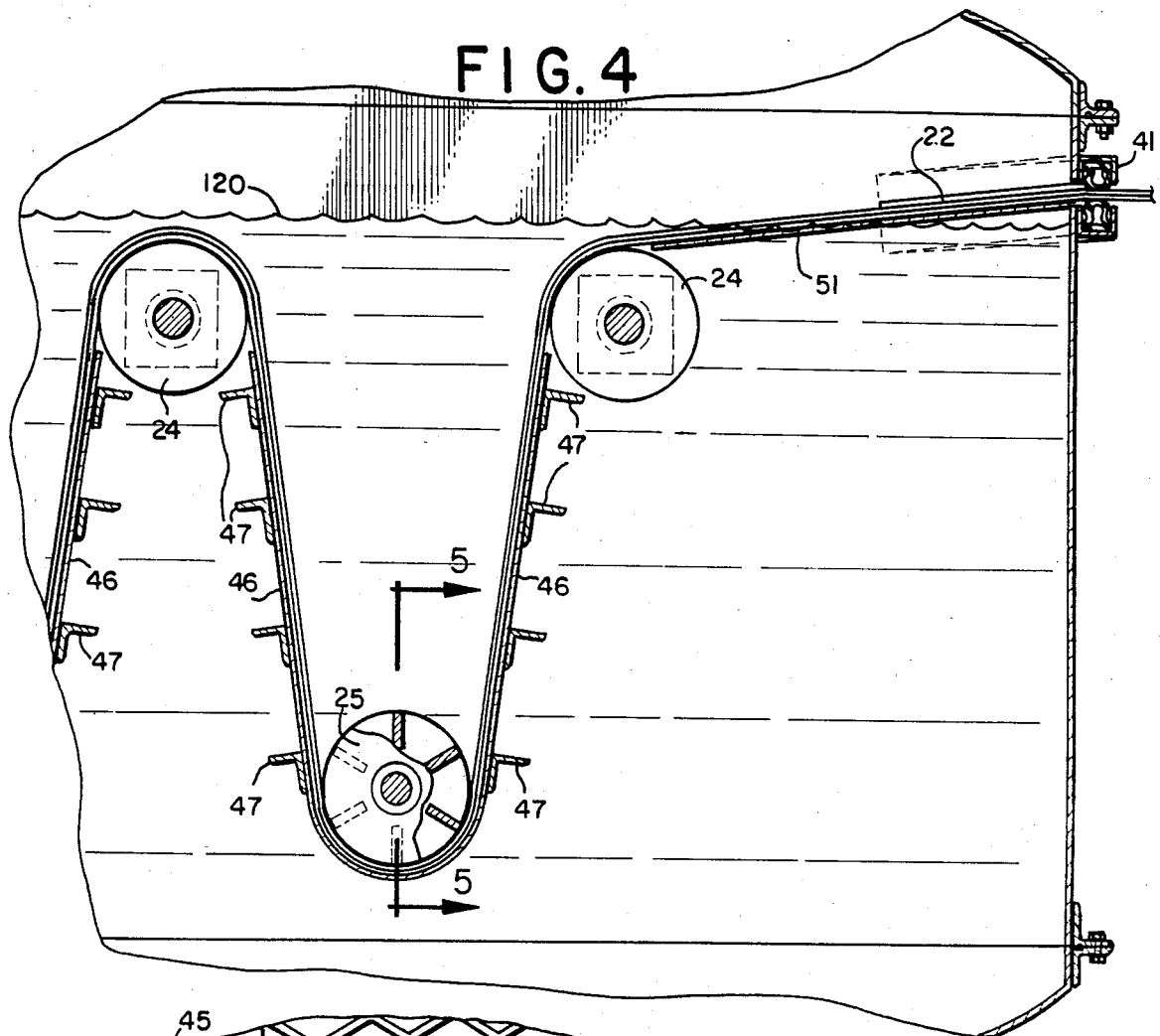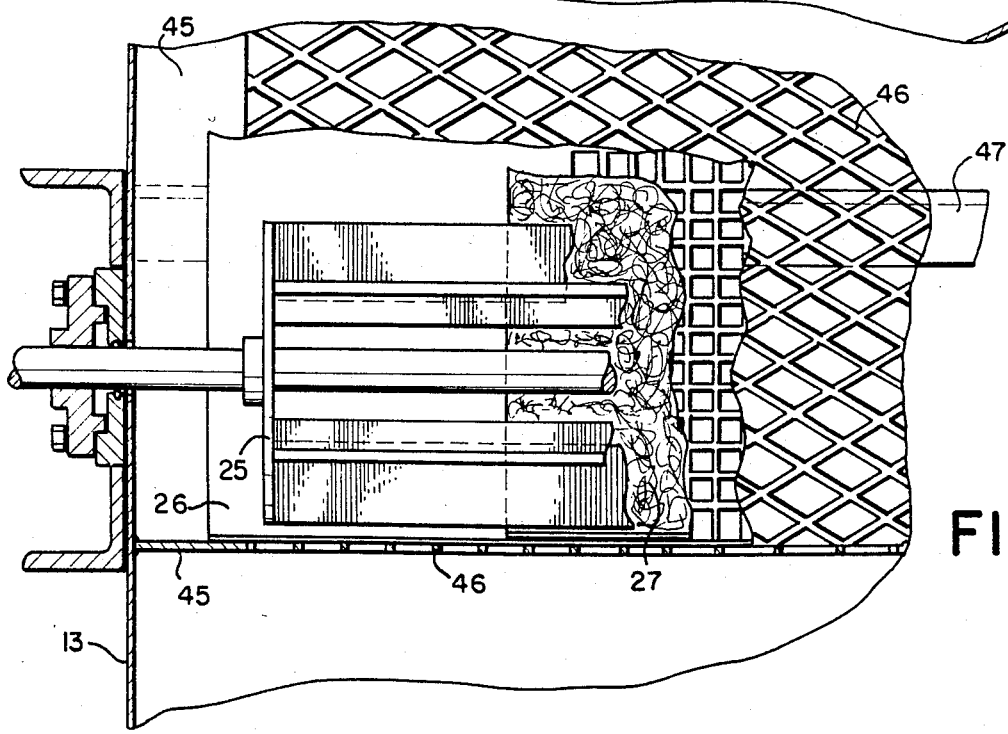

ROLLING FILTER APPARATUS

RELATED APPLICATION

The present application is a continuation-in-part of abandoned U.S. patent application Ser. No. 482,618 which was filed Apr. 6, 1983 as a continuation-in-part of my earlier U.S. patent application Ser. No. 306,694 filed Sept. 29, 1981 entitled "Filter Apparatus" now U.S. Pat. No. 4,394,146.

FIELD OF THE INVENTION

The present invention relates to filter apparatus and more particularly to a rolling filter apparatus in which the filter medium comprises filter material which is advanced by a carrier web through the filter chamber so as to present fresh filtering surfaces to the flow of medium through the chamber, the material entrapped by the filter medium being carried out of the filter chamber with the spent filter material.

BACKGROUND OF THE INVENTION

Rolling filters of the general type to which the present invention relates have been used for many years in the filtration of gaseous medium, specifically air, but it has been impractical or uneconomical to use filter apparatus of this type in connection with the filtration of a liquid medium. The present invention provides a filter construction which permits the use of a rolling filter for filtering the flow of a liquid medium in a highly effective and efficient manner.

The filter media for liquid filtration have traditionally been a heavy layer of fibers or granular material which is in a form which can withstand the high pressure differentials which are normally associated with the filtration of a liquid flow. Such filter media are not conducive to use in a rolling filter. The normal liquid filtration apparatus utilizes backwashing or similar techniques which require interruption of the flow of the liquid through the filter chamber. If an uninterrupted flow is required, parallel filtration chambers are provided which permit diversion of the flow from one chamber to the next during backwashing or regeneration.

Gas filtration, on the other hand, has used a filter medium which is readily incorporated into a rolling filter and which therefore is effective and economical, particularly if modified as in my earlier Patent Application. However, until the present invention, there has not been any rolling filter apparatus which is effective and economical for use for filtration of flowing liquids.

SUMMARY OF THE INVENTION

With the foregoing in mind the present invention provides a rolling filter apparatus in which the filter medium carried through the filter chamber comprises an endless carrier web and a suitable filter material. The medium is slidably supported for travel in zig-zag runs by a foraminous support structure underlying the full width of the web so that the web effectively isolates the filter material from sliding engagement on the support structure. The carrier web also enables the use of filter material which may be fabricated in a simple and economical manner without sacrificing the efficiency of effectiveness of the filtration.

More specifically the present invention provides a filter apparatus which effectively supports the filter medium in a fashion to permit it to be advanced through the filter chamber without interrupting the flow of liquid through the filter chamber and without adversely affecting the effectiveness of the filter unit.

The filter medium comprises a carrier web and flexible filter material which is stored in roll form exteriorly of the filter chamber. The fresh material is fed into the filter chamber through a feed slot and the spent material is discharged from the filter chamber through an exit slot, suitable sealing means being provided in the slots to minimize escape of the liquid flow when the filter medium is stationary, and to enable the maintenance of a substantial pressure differential across the filter medium during normal operation.

BRIEF DESCRIPTION OF THE DRAWINGS

These and other features of the invention are more fully set forth in the detailed description hereinafter, with reference to the accompanying drawings wherein:

FIG. 4 is an enlarged fragmentary longitudinal sectional view of the feed end of the filter chamber of FIGS. 1–3 showing the filter-media feed opening; and FIG. 5 is an enlarged fragmentary transverse sectional view taken on the line 5—5 of FIG. 4.

DESCRIPTION OF A PREFERRED EMBODIMENT

Figure 1:
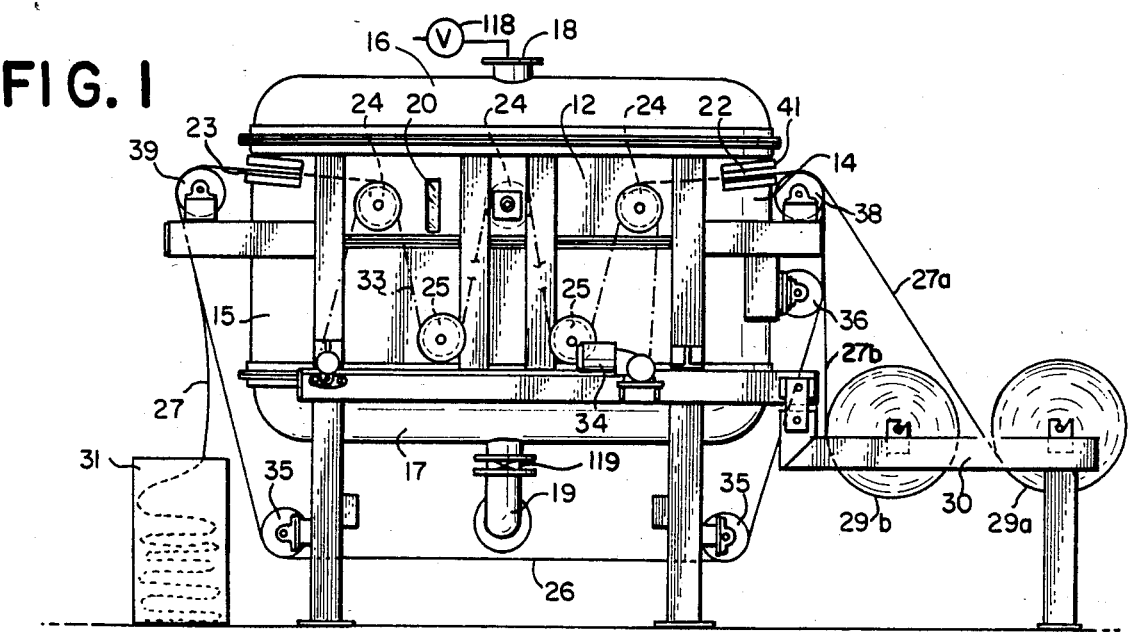
FIG. 1 is a view in side elevation of a filter apparatus embodying the present invention.
Figure 2:
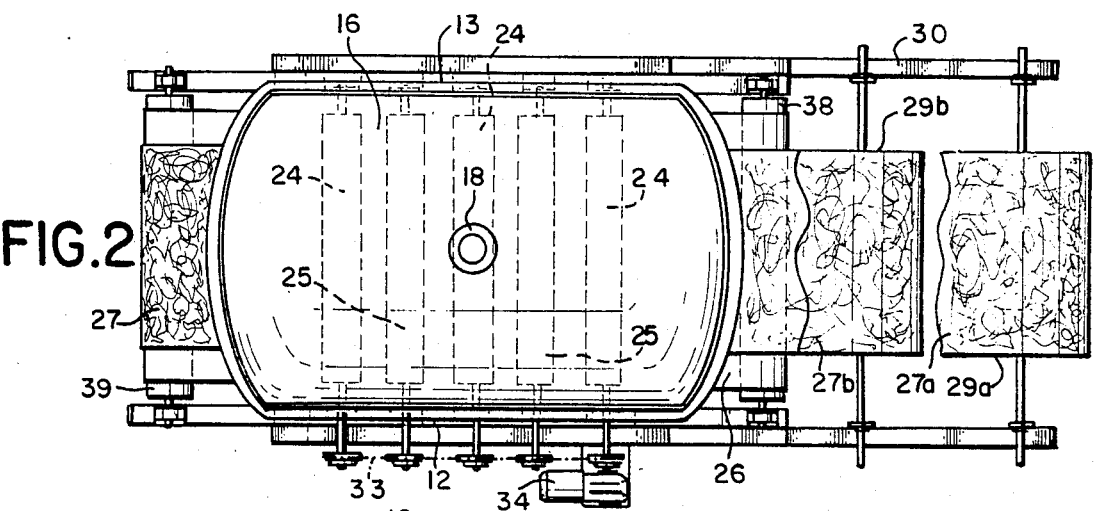
FIG. 2 is a plan view of the apparatus shown in FIG. 1.
Figure 3:
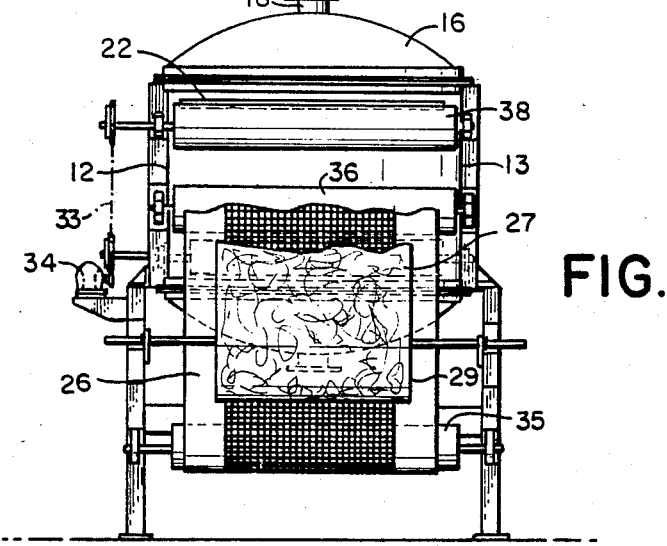
FIG. 3 is a right hand end view of the apparatus shown in FIGS. 1 and 2 with portions of the filter medium broken away.

The filter chamber of the illustrated embodiment of the present invention comprises a tank, for example fabricated of stainless steel, with straight sidewalls 12 and 13 between arcuate end walls 14 and 15 and domed top and bottom covers 16 and 17. A liquid inlet fitting is provided at 18 in the top portion and a liquid discharge is provided at 19 in the bottom cover 17. Unfiltered liquid is introduced into the tank through the inlet 18 and filtered liquid is withdrawn from the tank through the outlet 19, the rates of flow through the inlet and outlet being regulated so as to maintain a reservoir of liquid in the tank. In the present instance, the tank side walls are adapted and arranged to enable the liquid level of the reservoir of liquid in the tank to be maintained adjacent the upper limit of the straight walls 12 and 13 and a sight glass is provided at 20 to enable monitoring of the liquid level. For example, a valve shown schematically at 118 in the feed line to the inlet 18 may be provided to cooperate with a valve 119 in outlet 19 to control the liquid flow and maintain the liquid at the level shown in FIG. 4 at 120.

In accordance with the invention, a filter medium extends between the side walls 12 and 13 and follows a zig-zag path from one end wall 14 to the other. To this end, the end wall 14 has an entrance slot 22 for the filter medium and the end wall 15 has an exit slot 23. The slots 22 and 23 are disposed at an angle to the horizontal so as to cause the filter medium 15 to follow a declining path tangential to the first of a series of upper guide rolls 24 and an inclined path tangential to the final roll of the series of rolls 24. Between the first and final guide rolls 24 respectively at the entrance and exit ends of the tank, the filter medium follows a zig-zag path over the upper guide rolls 24 and under lower guide rolls or reels 25.

The filter medium comprises filter material 27 and a generally flat carrier web 26 disposed in an endless loop which follows the aforesaid zig-zag path through the chamber and returns from the exit end of the chamber at 23 back to the entrance end at 22 below the chamber as shown in FIG. 1. The water level in the tank is preferably maintained at a level above the upper rolls 24 and above the upper ends of the upright runs of the filter medium between the upper and lower levels of the guide rolls. The entrance and exit slots 22 and 23 are above the water level. The carrier web 26 extends across the full width of the tank and rides upon a sealing strip 45 projecting inwardly from the opposite side walls of the tank. The central portion of the carrier web 26 is foraminous to permit flow of water through the carrier strip in its central portion, the strip 45 serving to prevent flow of water around the edges.

The filter material 27 is deposited onto the foraminous portion of the carrier web 26 in advance of the entrance slot 22 and is stripped from the carrier web 26 after its passage through the exit slot 23. The filter material 27 is supplied in mat form from either or both supply rolls 29a and 29b in a roll stand 30 adjacent the entrance end and is collected in a suitable receiver 31 adjacent the exit end.

The upper and lower guide rolls 24 and 25 within the tank are driven synchronously, for example by a chain drive 33 which is trained over and under drive sprockets of the upper and lower rollers as shown in FIG. 1 and is driven by a suitable drive means 34. The driven rollers 24 and 25 are effective to advance the filter media through the filter chamber, the carrier web loop returning through suitable idler rolls 35 underneath the tank and a tensioning roll 36 adjacent the entrance end. Suitable guide means may be provided to accurately position the filter material 27 in registry with the foraminous portion of the carrier web as it enters the filter chamber over the entrance roll 38, and suitable stripping means may be provided to strip the filter material 27 from the carrier web 26 after it passes over the exit idler roll 39. The filter material 27 and the carrier web 26 comprise the filter medium, which is guided through the chamber from the entrance roll 38 to the exit roll 39 by guide means which includes the upper and lower guide rolls 24 and 25.

Preferably the web and carrier are advanced intermittently either at appropriately timed intervals or in response to sensors which are effective to sense the degree of impairment of the filtering action which arises because of clogging or excess loading of the filter material. The degree of advance may be varied in accordance with the requirements of the filter apparatus and the character of the contaminants in the flow of unfiltered liquid. The drive means 34 preferably comprises a drive motor with suitable actuating controls responsive to either a timing device or a sensor, as discussed above. Effective filtration may be achieved if the filter material is advanced only the distance between adjacent rolls so that in each advance the filter media which is at the bottom of the reservoir is advanced to the top of the reservoir, and vice versa filter media which is previously at the top of the reservoir is advanced back to the bottom prior to being discharged. In such a case, the flow through the filter material is greater adjacent the entrance end of the filter chamber than it is adjacent the exit end of the chamber. Alternatively the filter material may be advanced a distance corresponding to the entire length of the filter medium in the chamber between the first and last upper roll 24 so as to provide fresh filter material throughout the zag-zag path after each advance. In either case, the construction of the filter chamber permits the flow of the liquid through the filter chamber to continue during such advance, as will be set forth more fully hereinafter.

To avoid excessive splashing or undesirable discharge of the unfiltered liquid from the filter chamber through the entrance and exit slots 22 and 23, and to enable the maintenance of a desired pressure differential across the filter medium, suitable sealing means is provided as indicated at 41 in FIG. 4. As shown in this figure the sealing means comprise pneumatic or hydraulic seals disposed above and below the entrance and exit slots and extending along their complete length. When the filter material is stationary, the seals are inflated to bear against the opposite surfaces of the carrier web 26 and filter material 27 so as to seal off the slot and retard discharge of liquid from the interior of the filter chamber. During the period when the filter material is advanced, the seals 41 are evacuated so as to be withdrawn from engagement with the carrier web 26 and the filter material 27, permitting free advance of the filter material without any braking action as a result of the seals. Thus the seals 41 are actuated in coordination with the drive means 34 so as to be energized or activated when the drive means 34 is deenergized, and to be deenergized or inactivated when the drive means 34 is energized.

The filter material 27 is preferably a composite two-layered structure comprising non-woven web 27a of the type disclosed in Klein U.S. Pat. No. 4,293,378 and a second non-woven web 27b of the type disclosed in pending U.S. patent application Ser. No. 258,443 now U.S. Pat. No. 4,395,332 (Canadian Pat. No. 1,134,755 issued Nov. 2, 1982) the entire disclosures of which are hereby incorporated into the present application by reference. It is sufficient to state that the filter material 27a comprises a loose web of glass fibers intermixed with micro-bits of an expanded thermoplastic styrene-polymer or expanded thermoplastic lower polyolefin or flexible foam polyurethane. The glass fiber filter mat of the '378 patent also includes a suitable organic binder, preferably polyvinyl alcohol, an intimate blend or co-beat of cellulose fibers, and any of the aforesaid polymer microbits, and a melamine formaldehyde resin as a wet strength enhancing agent which also serves to bind the filter material component together. The mat 27b is preferably comprised of cellulosic fibers and any of the aforesaid polymer microbits, preferably blended to form a cobeat, and is loaded with finely divided activated carbon. Either filter material may also contain polyester fiber for added wet web strength, and other additives or other constituents such as particulate adsorbing agents to remove various dissolved substances from liquid filtered through the mat. The filter mat may be fabricated in various ways to provide the porosity and the filtration characteristics which are desired for a particular end use. The carbon-loaded paper mat 27b is sandwiched between the glass mat 27a and the carrier web 26 so that the greater strength and stability of the glass material 27a protects the carbon-loaded mat 27b.

A suitable filter mat 27a for use in the present invention is the mat described in Example 2 of Klein U.S. Pat. No. 4,293,378 which is made using paper-making apparatus. The porosity of the finished mat is generally from about 300 to about 1500 liters per minute per square decimeter at a pressure differential of 2.54 cm. of water (gauge). The mat possesses excellent wet strength, which is on the order of 2 kg./cm. A suitable mat 27b is the mat made by the method described in Example 3 of U.S. Pat. No. 4,395,332. The mats just described are commercially available from Crane and Co., Inc., Dalton, Mass.

In accordance with the present invention means is provided to assure proper support and guidance of the filter medium as it is positioned within and advanced through the filter chamber so as to avoid damage to the filter medium by the rigorous flow characteristics of the liquid in the filter chamber. The filter chamber is designed to accommodate a working pressure differential across the filter medium. As shown in FIGS. 4 and 5, the filter material 27 is carried through the chamber by the carrier web 26 which overlies the inwardly directed sealing strip or flange 45 which projects inwardly from the opposite sidewalls 12 and 13. In the present instance the sealing strip 45 is welded to the sidewall 13 so as to track the path of the carrier web 26 in its passage through the filter chamber.

A sealing strip 45 is positioned on each of the sidewalls 12 and 13 and a support shelf 46 extends across the full width of the filter chamber between the sealing strips 45, 45. The shelf 46 is illustrated in the drawing as an expanded metal grating which is flattened to provide a low coefficient of friction with respect to the carrier web 26. However it has been found that a perforated metal screen provides improved structural and operational characteristics in the filter chamber. The foraminous nature of the support shelf 46 permits flow of water through the filter material 27 carried by the carrier web 26 without substantial impedance, particularly inasmuch as the foraminous portion of the carrier web is in sliding engagement with the foraminous shelf 46. Thus, the foraminous shelf 46 cooperates with the sealing strips 45, 45 to direct the carrier web 26 between the upper and lower rolls 24 and 25, so that the material is guided by the rolls and the shelf in a predetermined zig-zag path. The resistance of the filter medium to the flow of water may generate a reaction force generally perpendicular to the surface of the filter material which, in turn applies pressure to the foraminous shelf 46. To limit deflection of the foraminous shelf 46 transverse reinforcing struts or girders 47 extend from side to side and undergrid the foraminous shelf 46. As shown in FIG. 4, the support girders 47 comprise angle irons which are firmly mounted on the sidewalls 12 and 13, for example by welding and securely support the foraminous shelf across the full width, for example by tack welding to the shelf. As shown in FIG. 4, the shelf 46 is tangential to the upper rolls 24 and circumscribes the lower rolls or reels 25. Thus at the bottom of the reservoir the shelf 46 supports the carrier web 26 and the filter medium throughout its entire passage around the lower roll 25 whereas at the top of the reservoir, the carrier web 26 and filter material 27 are supported only by the turning rolls 24.

As shown in FIG. 4, each of the turning rolls 24 has a solid imperforate cylindrical shell which firmly supports the carrier web 26. The rolls or reels 25 at the bottom of the reservoir, on the other hand, comprise slatted rolls having slats or vanes extending longitudinally of the roll between circular end plates. The slatted formation of the rolls or reels 25 is effective to guide the carrier web 26 and the filter material 27 in its turning movement around the roll 25 without putting substantial surface pressure on the side of the filter web 27 which is exposed to the unfiltered water, thereby avoiding the possibility of causing inefficient filtration which would occur if a solid cylindrical surface were used, and the solid surface expressed the particulate matter deposited on the upper surface of the filter medium through the filter material 27 and the foraminous portion of the carrier web 26 into the filtered liquid on the underside of the filter medium.

As indicated in FIG. 4, the shelf portion 51 extending angularly downward between the entrance slot 22 and the first upper turning roll 24 is imperforate and provides a solid supporting shelf underlying the carrier web and the filter material as it enters the chamber. Since this portion of the filter material is inclined, it is desirable to reduce the stress imparted to the material by effectively interrupting any flow of liquid through the material while it approaches the first turning roll. Thus, because of the imperforate shelf 51 at the entrance end, the impact of water splashing onto the shelf has little tendency to fracture or otherwise damage the filter material as it travels between the entrance slot 22 and the first turning roll 24. A similar imperforate shelf is provided at the exit end of the chamber upwardly inclined between the final turning roll 24 and the exit slot 23. The inclination of the path of the filter medium at the entrance and exit ends of the filter chamber enables the water level to be above the upper rollers 24 and below the entrance and exit slots 22 and 23, thereby maintaining the filter medium completely immersed in its zig-zag runs. Thus, by this construction, the present invention causes the principle flow through the filter material to occur in those sections of the material which are disposed substantially vertically within the filter chamber.

As shown in FIG. 4, the upright runs of the filter material are approximately within 10 degrees of the vertical so that the normal flow through the filter material is substantially horizontal thereby eliminating to a large extent the accumulation of loose, filtered-out particles on the upstream surface of the filter material. Such loose particles are free to fall to the bottom of the reservoir in the area where the filter material is directed around the reel 25. A major part of the loose material may accumulate at the side edges of the web 26 beyond the edges of the material 27. If accumulation of loose particulate material becomes a problem within the reel, it may be removed, for example by siphoning, or with other extraction devices, without substantially interfering with the normal operation of the filter apparatus.

The carrier web 26 preferably comprises a woven PTFE/glass fabric screening impregnated with PTFE resins. The interstices of the screening fabric are suitably square with a weave density of six openings per inch in each direction. Such screen fabric is dimensionally stable from −415° F. to +600° F. and is resistant to both chemical degradation and abrasion. It has good breaking strength and tear strength, and a thickness of 0.030 inch. A screen fabric of this character has unidirectional porosity, permitting free flow normal to the plane of the fabric but preventing lateral flow within the plane of the fabric. In the marginal portions of the carrier web, on opposite sides of the foraminous central portion, the impregnation of the fabric screening is sufficient to close interstices so as to provide a continuous uninterrupted marginal portion which spans between the sealing strip 45 and the edge of the filter material 27.

The use of a carrier web in this fashion makes it possible to minimize the expense of fabrication of the filter material since the filter material is not required to have sufficient rigidity to be self-sustaining as it is advanced through the filter chamber. Furthermore, the edge portions of the filter material need not be specially formed to provide a seal with the side walls of the filter chamber and irregular edges may be tolerated without adversely affecting the filtering capacity of the apparatus since the irregularities in the edges overlie the imperforate portions of the web 26 which do not permit leakage of unfiltered liquid through the irregularities. The composite filter medium consisting of the mats 27a and 27b and web 26 simplifies recovery operations. In some applications, the particulate matter can be washed from the filter material 27 and discarded to enable the material to be recycled. In other applications, the particulate matter may be recovered from the material and salvaged, and the spent material may be discarded. For these several reasons, the present invention provides an apparatus which may utilize filter mats which are fabricated and wound onto rolls for use in the present apparatus at minimum expense.

While a particular embodiment of the present invention has been herein illustrated and described it is not intended to limit the invention to such disclosures but changes and modifications may be made therein and thereto within the scope of the following claims.

I claim:

1. A rolling filter apparatus having
   a filter chamber with an inlet for receiving liquid medium, an outlet for discharging filtered liquid medium, said filter chamber having opposite side walls defining between them a path for the liquid medium from said inlet to said outlet;
   a filter medium spanning across said filter chamber between said side walls and having opposite edge portions disposed adjacent the respective side walls, said filter medium comprising a carrier web and filter material, said carrier web extending continuously across the full width of the filter chamber between said side walls and having imperforate longitudinal marginal edge portions and a medial foraminous zone, said filter material covering said foraminous zone with its side edges overlying said marginal edge portions of the carrier web, and means to guide said medium in a predetermined path through said filter chamber;
   said filter chamber having an entrance end and an exit end for said filter medium, and flange means projecting inwardly of said chamber from said sidewalls, said flange means being disposed on said opposite side walls in alignment with said predetermined path to underlie the edge portions of said filter medium and occupy the space between said filter medium and said side walls;
   means to advance said filter medium longitudinally through said filter chamber from its entrance end to its exit end, said medium spanning between said flange means with the side edges of said filter medium overlying the free edges of said flange means; and
   means to assemble the filter material of said filter medium onto said carrier web adjacent said entrance end of the chamber and feed the assembled filter medium into the filter chamber with the edges overlying the upstream surface of the flange means in intimate engagement therewith, whereby liquid medium flowing through said filter chamber must pass through said filter material in its travel from said inlet to said outlet;
   said means to guide said filter medium including a first series of parallel turning rolls disposed at a first level across the liquid inlet of said chamber and a second series of parallel turning rolls disposed at a second level across the liquid outlet of said chamber, said turning rolls being positioned and arranged so that said predetermined path extends in upright zig-zag runs alternately between said turning rolls of the first and second series;
   said inlet and outlet of said filter chamber having means to control the rates of flow through said inlet and outlet to maintain a reservoir of the liquid in the filter chamber having a liquid level above the upper ends of said upright zig-zag runs to completely immerse said upright runs.

2. Apparatus according to claim 1 wherein said guide means includes a foraminous shelf extending between said flange means to underlie and support said carrier web across the full width between the side walls of said filter chamber.

3. Apparatus according to claim 2 wherein said shelf is made of metal and has support girders underlying said shelf and mounted on said side walls.

4. Apparatus according to claim 1, wherein said guide means includes an imperforate shelf section extending from said entrance end to the first roll of said first series and a second imperforate shelf section extending from the last roll of said first series to said exit end.

5. Apparatus according to claim 1 wherein said carrier web comprises foraminous non-metallic screening fabric disposed in an endless loop, said guide means having means to cycle said loop through said filter chamber in said predetermined path.

6. Apparatus according to claim 5 wherein said foraminous material is a woven PTFE/glass fabric screening impregnated with PTFE resins.

7. Apparatus according to claim 1 wherein said filter material comprises a web of fibrous glass material with micro-bits of a synthetic polymer material combined with said fibers together with a binding agent to produce a mat which is permeable to liquid flow.

8. Apparatus according to claim 7 wherein said filter material includes a second web comprising an intimate blend or cobeat of cellulose fibers and said micro-bits and particulate carbonaceous adsorbing agents.

9. Apparatus according to claim 1 wherein said guide means for said filter medium includes an entrance slot for the filter medium at the entrance end of the filter chamber and an exit slot for the filter medium at the exit end of said filter chamber, said entrance and exit slots having sealing means cooperable with the filter medium to close said slots when said filter medium is stationary in said chamber.

10. Apparatus according to claim 9 wherein said means to advance said filter medium longitudinally comprises a drive motor, and including means to inactivate said sealing means for said slots when said drive motor is activated, and to activate said sealing means for said slots when said drive motor is inactivated.

11. Apparatus according to claim 1 wherein said means to control the rates of liquid flow includes valves.

12. Apparatus for a rolling filter comprising
    a filter chamber with an inlet for receiving liquid medium, an outlet for discharging filtered liquid medium, said filter chamber having opposite side walls defining between them a path for the liquid medium from said inlet to said outlet;

filter material support means spanning across said filter chamber between said side walls and having opposite edge portions disposed adjacent the respective side walls to guide filter material in a predetermined path through said filter chamber, said filter material support means comprising a carrier web extending continuously across the full width of the filter chamber between said side walls and having imperforate longitudinal marginal edge portions and a medial foraminous zone;

guide means supporting said carrier web comprising a first series of parallel turning rolls disposed at one level in the chamber across the liquid inlet of said chamber and a second series of parallel turning rolls disposed at a second level in the chamber across the liquid outlet of said chamber, said turning rolls being positioned and arranged for guiding said web in said predetermined path, said path having upright runs extending zig-zag alternately between the first and second levels of said turning rolls of the first and second series respectively, said filter chamber inlet and outlet having flow control means to maintain a reservoir for the liquid medium in the chamber with a liquid level above the upper ends of the upright runs;

flange means projecting inwardly of said chamber from said sidewalls, said flange means being disposed on said opposite side walls in alignment with said predetermined path to underlie the edge portions of said filter material support means and occupy the space between said support means and said side walls;

said apparatus having an entrance end and an exit end and means to advance said filter material support means longitudinally through said filter chamber from its entrance end to its exit end, said filter material support means spanning between said flange means with the side edges of said filter material support means overlying the free edges of said flange means; and means to assemble filter material onto said carrier web adjacent said entrance end of the chamber so that the filter material on said carrier web is positioned to cover said foraminous zone with its side edges at least partially overlying said marginal edge portions, and means to feed the carrier web into the filter chamber with the edges of the carrier web overlying the upstream surface of the flange means in intimate engagement therewith.

13. Apparatus according to claim 12 wherein said means to assemble filter material comprises a roll stand having means to support a plurality of supply rolls of filter material positioned so that filter material from each supply roll may be positioned on said carrier web.

14. Apparatus according to claim 13 including a first roll having a first mat of non-woven glass fibers with micro-bits of an expanded polymer and a binder, and a second roll having a second mat of non-woven cellulosic fibers with micro-bits of an expanded polymer and at least one particulate carbonaceous absorbent, said first and second rolls being carried by said means to support a plurality of supply rolls positioned so that filter material from both of said first and second rolls may be positioned in overlying relationship on said carrier web.

15. Apparatus according to claim 14 wherein said roll stand is positioned and arranged to assemble said first mat to said carrier web on top of said second mat, whereby said second mat is sandwiched between said first mat and said web.

16. A rolling filter apparatus having
a filter chamber with an inlet for receiving liquid medium, an outlet for discharging filtered liquid medium, said filter chamber having side walls defining between them a path for the liquid medium from said inlet to said outlet;
a filter medium spanning across said filter chamber between said side walls and having opposite edge portions disposed adjacent the respective side walls, said filter medium comprising a carrier web and filter material, said carrier web extending continuously across the full width of the filter chamber between said side walls and having imperforate longitudinal marginal edge portions and a medial foraminous zone, said filter material covering said foraminous zone with its side edges overlying said marginal edge portions of the carrier web;
means to guide said medium in a predetermined path through said filter chamber;
said filter chamber having an entrance end and an exit end for said filter medium, and flange means projecting inwardly of said chamber from said sidewalls, said flange means being disposed on said opposite side walls in alignment with said predetermined path to underlie the edge portions of said filter medium and occupy the space between said filter medium and side walls;
means cooperating with said guide means to advance said filter medium longitudinally through said filter chamber from its entrance end to its exit end, said medium spanning between said flange means with the side edges of said filter medium overlying the free edges of said flange means;
means to assemble the filter material of said filter medium onto said carrier web adjacent said entrance end of the chamber and feed the assembled filter medium into the filter chamber with the edges overlying the upstream surface of the flange means in intimate engagement therewith, whereby liquid medium flowing through said filter chamber must pass through said filter material in its travel from said inlet to said outlet; and
said means to guide said filter medium including a first series of parallel turning rolls disposed across the liquid inlet of said chamber and a second series of parallel turning rolls disposed across the liquid outlet of said chamber, said turning rolls being positioned and arranged so that said predetermined path extends in zig-zag runs alternately between said turning rolls of the first and second series, means to disassemble said filter material from said carrier web beyond said exit end, whereby said filter material and carrier web follow said path together through said filter chamber.

17. Apparatus according to claim 16 wherein said means to assemble the filter material onto the carrier web comprises a supply roll of a first filter material, and a supply roll of a second filter material, said rolls being positioned and arranged to overlay the second filter material on top of the first filter material on the carrier web.

* * * * *